July 1, 1924.  1,499,705

H. J. STRAUSS

ATTACHMENT FOR VEHICLE WHEELS

Filed Sept. 30, 1922

Inventor

Henry J. Strauss.

By Henry E. Rockwell.

Attorney

Patented July 1, 1924.

1,499,705

UNITED STATES PATENT OFFICE.

HENRY J. STRAUSS, OF STRATFORD, CONNECTICUT.

ATTACHMENT FOR VEHICLE WHEELS.

Application filed September 30, 1922. Serial No. 591,570.

*To all whom it may concern:*

Be it known that I, HENRY J. STRAUSS, a citizen of the United States, residing in the town of Stratford, county of Fairfield, State of Connecticut, have invented certain new and useful Improvements in Attachments for Vehicle Wheels, of which the following is a full, clear, and exact description.

My invention relates to the class of attachments for vehicle wheels by the use of which vehicle wheels may be freed from mud-holes, sand, etc., into which they may have become imbedded, sunken or stuck.

Various devices have been suggested for use in freeing the vehicle wheels under such circumstances, but in one or more features these devices have failed to be a complete success. A device is needed which will be readily attached, adapted for use on various vehicles, easily carried on the vehicle without requiring too much storage space, and one that will lift, support and increase traction and yet be sufficiently flexible to adapt itself to unevenness in the roadbed and be detachably connectible, across the vehicle, to both wheels.

The object of my invention, therefore, is to provide an attachment fulfilling the requirements mentioned above.

To these and other ends my invention consists in the novel features and combinations of parts to be hereinafter described and claimed.

Figure 1:
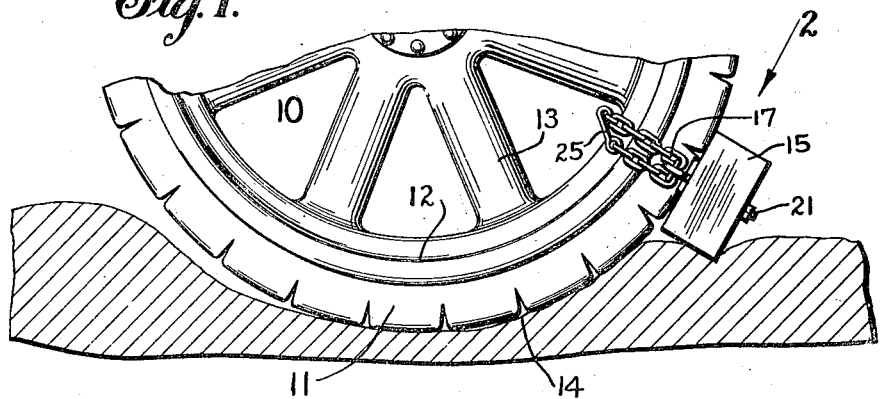
Fig. 1 is an end elevation of my attachment shown applied to a solid tired truck wheel.

A solid tired truck wheel has been used to illustrate the use of my invention, but it is to be understood that the attachment shown is applicable for use on other types of vehicles and is useful when applied to either the driving wheels or the steering wheels and that the details of the attachment may be varied somewhat from those described without departing from the principles of the invention.

In the drawings, the truck wheel 10 comprising the tire 11, rim 12 and spokes 13 is shown partially imbedded or sunken in sand or mud represented at 14 from which it is desirable to remove the same. Without an attachment of some sort the operator or driver might attempt to force the vehicle out by the application of considerable power. This method, sometimes successful when only slightly stuck, usually results in severe strain to the driving mechanism and in some cases stripped gears or broken spindles. A careful driver, therefore, will desist from such attempts and relieve the wheel or wheels from the rut by the use of attachments or by jacking up the wheel and blocking under the same, which method is laborious and usually consumes considerable time.

The improved attachment of this invention, shown attached to the wheel 10, comprises a pair of blocks 15 and 16, preferably of wood, to which are secured chains 17 and 18, respectively, by eyebolts 19 and 20 which pass through the inner end of each block, respectively. At the outer end of each block is another eyebolt represented at 21 and 22. The two blocks may be connected together when being placed in position by the use of a hollow cylindrical member 23 secured by suitable bolts or screws to block 15 and a solid cylindrical member 24 secured in like manner to block 16. The chains 17 and 18 are provided at their free ends with hooks or suitable catches 25 and 26.

Figure 2:
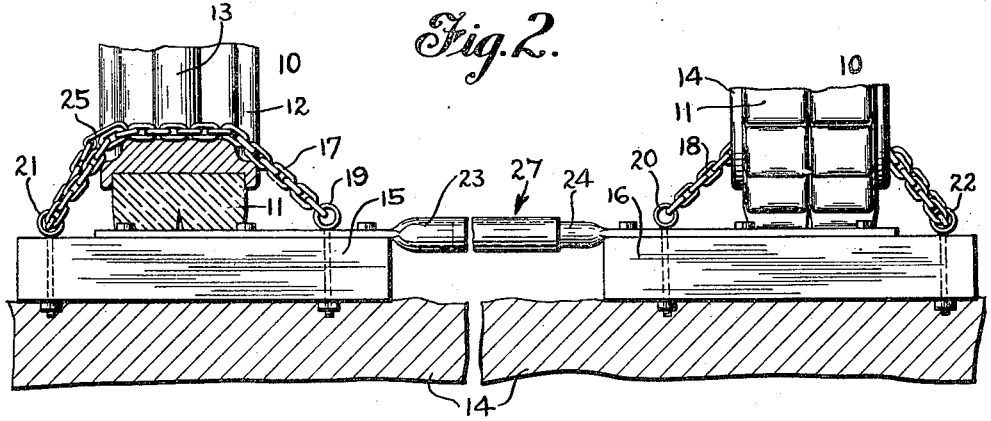
Fig. 2 is a side elevation of the same looking in the direction of the arrow 2, Fig. 1, and showing one wheel sectioned for the sake of clearness.
Figure 3:
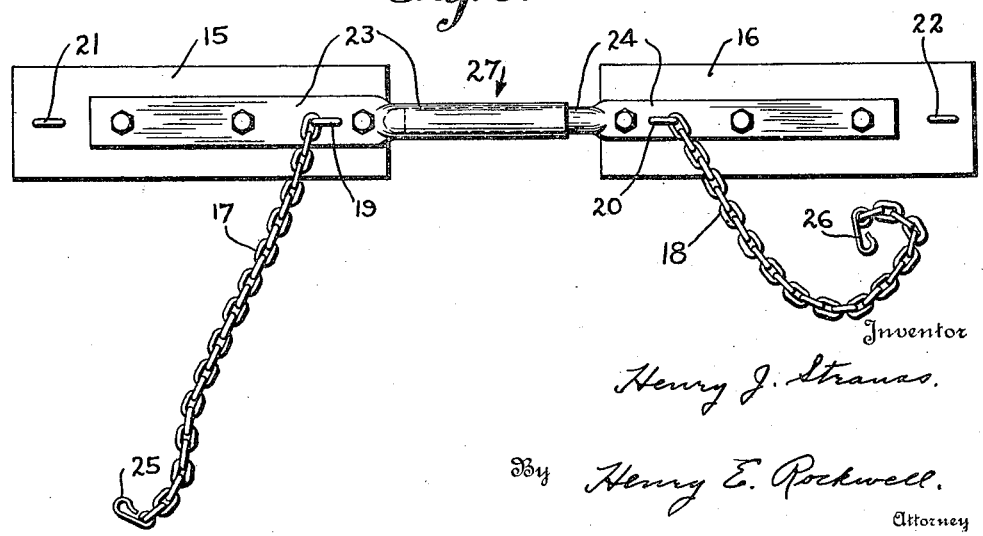
Fig. 3 is a top plan view of the attachment detached from the wheels.

Presuming that one of the truck wheels, as illustrated, is imbedded or sunken into a mudhole, the operator of the vehicle places the block 15 in front or to the rear of wheel 10, threads the chain 17 through the wheel and thence through the eyebolt 21 and by the use of the hook or snap 25 being snapped into a link of the chain secures the chain tightly in position, as shown at the left hand of Fig. 2. The other block is similarly attached to the opposite wheel upon the same side but not until the member 24 has been inserted into the hollow member 23, into which it will readily slide to form a telescopic joint or connector designated in its entirety as 27.

Having attached the device as above described, and as is obvious, without the necessity of getting under the vehicle, the operator merely throws the power mechanism into gear and slowly revolves the wheels.

The wheels, by the revolving motion transmitted through the medium of the spokes 13 and chains 17 and 18, tend to pull the blocks 15 and 16 into the roadbed under them, but owing to the increased traction afforded by the use of the blocks, the wheels are lifted up, moving forwardly or rearwardly onto the blocks and over the blocks away from the depression or rut. Both blocks being connected by members 23 and 24 of the connector 27, the tendency of the free wheel to spin and thereby absorb all the power is avoided. The free wheel, by transmitting power through the telescopic joint, generated by the increased traction afforded by its block, assists in the removal of the sunken wheel.

Having freed the wheel or wheels from the mud or sand, the blocks may be disengaged and used again, if it is found to be necessary. It may be advisable to stop the wheels when the blocks are directly under them, in which position the wheels are above the roadbed, and supported by the blocks, and to lay planks or similar repair materials required by the condition of the roadbed over which the vehicle is to be moved, The attachment when applied to the driving wheels of a vehicle serves to increase the diameter of the wheel and thereby increases the leverage, which in turn increases the pulling power of the driving wheels. When constructed in my preferred form, as shown in the drawings, the effective width of the wheel tread is increased, supplying the wheel with greatly increased traction ability.

The telescopic joint or connector in addition to facilitating the attachment to the vehicle wheels and adapting the same for use upon vehicles of various widths, also allows the individual blocks to swing relative to each other about the longitudinal center of the joint. This relative movement is a valuable asset to the device as twisting strains, due to unevennesses in the roadbed or differences in levels under each block, are avoided, the blocks through this joint being capable of a substantial degree of twisting without the rupture or bending of the connecting members. It is necessary, however, that the connector be, to a certain amount, rigid, especially as to the forward or rearward movement thereof, in order that the two blocks, and therefore the wheels, will be positively connected for simultaneous movement.

While I have shown and described a preferred form of my invention, it will be understood that the same is not limited in all of its details, but is capable of many modifications and variations which lie within the spirit of the invention and the scope of the appended claims.

What I claim is:

1. The combination with a pair of vehicle supporting wheels of a pair of blocks respectively connected thereto, and a pair of members secured respectively to said blocks, said members being releasably connectible.

2. The combination with a pair of vehicle wheels of a pair of blocks respectively connected thereto, said blocks being connected together by an extensible connector.

3. The combination with a pair of vehicle wheels of a pair of blocks respectively connected thereto, said blocks being connected together by a telescopic connector.

4. The combination with a pair of vehicle wheels of a pair of members detachably connected respectively to the circumference thereof, said members being connected together by a telescopic connector.

5. An attachment for vehicle wheels, comprising a pair of members connectible respectively to opposite wheels, and means rigidly secured to one of said members and joining said members whereby lateral movement of one of said members is allowed relatively to the other.

6. An attachment for vehicle wheels, for the purpose described, comprising a pair of blocks having means thereon to be detachably secured to the circumference of a pair of wheels and a telescopic connector connecting said blocks.

7. An attachment for vehicle wheels for the purpose described, comprising a pair of blocks, flexible means whereby the blocks may be secured to the circumference of a pair of wheels respectively, and extensible means connecting said blocks.

8. An attachment for vehicle wheels for the purpose described, comprising a pair of blocks, flexible means whereby the blocks may be secured to the circumference of a pair of wheels respectively, and separable means connecting said blocks, said means comprising a telescopic connector.

9. An attachment for vehicle wheels for the purpose described, comprising a pair of blocks, flexible means whereby the blocks may be secured to the circumference of a pair of wheels respectively, and separable means connecting said blocks, said means comprising a hollow cylindrical member secured to one of said blocks and another member secured to the other block, said first mentioned member adapted to receive the second mentioned member to form an extensible joint.

10. Means to connect two wheels together at their circumferences comprising a block attached to each wheel and a telescopic connector between said blocks.

11. In an attachment for vehicle wheels, a pair of blocks provided with flexible means for attachment to vehicle wheels, and a connector member upon each block, one of said connector members rotatable within the other.

12. In an attachment for vehicle wheels, a pair of blocks provided with flexible means for attachment to vehicle wheels, and a connector member upon each block, one of said connector members rotatable and slidable within the other.

13. Means to connect two opposite wheels of a vehicle together at their circumferences, comprising a pair of tractive members respectively attached to the wheels, and an extensible connector between and secured to said members.

14. In combination with a pair of opposing vehicle wheels, a separate tractive member detachably secured to the periphery of each of said wheels, and means rigidly secured to one of said tractive members and connecting said tractive members whereby relative motion between said members in a forward or rearward direction is prevented but relative movement between said members in another direction is allowed.

In witness whereof, I have hereunto set my hand this 29th day of Sept., 1922.

HENRY J. STRAUSS.